(12) United States Patent
Ruddle

(10) Patent No.: US 6,968,458 B1
(45) Date of Patent: Nov. 22, 2005

(54) APPARATUS AND METHOD FOR PROVIDING SECURE COMMUNICATION ON A NETWORK

(76) Inventor: Ian Ruddle, 115 E. 86th St., New York, NY (US) 10028

( * ) Notice: Subject to any disclaimer, the term of this patent is extended or adjusted under 35 U.S.C. 154(b) by 847 days.

(21) Appl. No.: 09/843,460

(22) Filed: Apr. 25, 2001

Related U.S. Application Data

(60) Provisional application No. 60/200,274, filed on Apr. 28, 2000.

(51) Int. Cl.[7] .............................................. G06F 1/26
(52) U.S. Cl. ..................... 713/186; 713/182; 713/168; 713/193; 713/200; 713/201
(58) Field of Search ............................... 713/186, 182, 713/168, 193, 200, 201

(56) References Cited

U.S. PATENT DOCUMENTS

| | | | | |
|---|---|---|---|---|
| 6,023,762 A | * | 2/2000 | Dean et al. ................. | 713/193 |
| 6,134,659 A | * | 10/2000 | Sprong et al. ............... | 713/190 |
| 6,169,976 B1 | * | 1/2001 | Colosso ....................... | 705/59 |
| 6,314,521 B1 | * | 11/2001 | Debry ......................... | 713/201 |
| 6,442,696 B1 | * | 8/2002 | Wray et al. .................. | 713/201 |

* cited by examiner

*Primary Examiner*—Thomas R. Peeso

(74) *Attorney, Agent, or Firm*—Ward & Olivo

(57) ABSTRACT

The present invention provides a method of transmitting electronic communication where the sender includes an instruction set with the electronic communication. A sending computer encrypts the electronic communication and sends both the encrypted communication and the instruction set to a receiving computer. The instruction set executes a set of pre-determined operations designed to protect the content of the electronic communication if an unauthorized recipient attempts to access the contents. Further, the instruction set includes instructions that delete the electronic communication if the recipient does not retrieve the communication within a pre-determined time period.

18 Claims, 8 Drawing Sheets

APPARATUS AND METHOD FOR PROVIDING SECURE COMMUNICATION ON A NETWORK

This application claims benefit of Provisional Application No. 60/200,274, filed Apr. 28, 2000.

BRIEF DESCRIPTION OF THE INVENTION

The present invention is directed to a secure computer-based messaging system. More particularly, the present invention provides a method for a secure communication that ensures that the communication is read only by the intended user by destroying the communication if an unintended recipient attempts to read the communication.

BACKGROUND OF THE INVENTION

With the increasing use of computers, electronic communication has become more popular. The great flexibility of Transmission Control Protocol/Internet Protocol (TCP/IP) has led to its worldwide acceptance as the basic Internet and intranet communications protocol. TCP/IP allows information to be sent from one computer to another through a variety of intermediate computers and separate networks before it reaches its intended destination. Typically, in fact, information is transmitted in this manner, particularly over the Internet. This method of transmission, through intermediate computers and separate networks, makes it possible for a third party to interfere with communications. A third party can interfere with transmitted Internet communication in several ways. A third party can "eavesdrop;" in other words, the information is not changed but its privacy is compromised. For example, an eavesdropper can obtain a credit card number, or record sensitive or classified information, and then pass on the original message to the intended recipient. Additionally, a third party can change or replace the information and then send it to the intended recipient.

Many sensitive personal and business communications transmitted over the Internet require precautions that address privacy concerns. Current so-called "secure" transmission techniques use various encryption technologies to achieve this goal. Public-key cryptography is one well-established technique that addresses some of the privacy concerns in electronic communication. The sender of the communication encrypts the communication using an encryption key. The recipient of the encrypted communication then decrypts the information using a decryption key. Only recipients who have a decryption key can decrypt the electronic communication and read its contents.

Although encryption provides a level of protection against third party interference with the electronic communication, an unauthorized recipient can still have access to the information contained in the communication if the recipient can decrypt the information. Consequently, there is a need to protect the content of an electronic communication should an unauthorized user gain access to the electronic communication and subsequently attempt to decrypt the electronic communication.

SUMMARY OF THE INVENTION

One embodiment of the invention provides for a method of securely transmitting an electronic communication such that only the intended recipient has access to the contents of the communication. The sender of the electronic communication encrypts the communication and includes a set of instructions with the electronic communication. If an unauthorized recipient attempts to decrypt the electronic communication, the recipient's computer automatically executes the included instructions. The instructions perform a set of tasks determined by the sender when the sender transmits the communication.

The instructions can perform one or all of the following operations: delete the communication if an unauthorized recipient attempts to decrypt the message; send the unauthorized recipient's identifying information to a security management location; delete selected files from the unauthorized recipient's computer; or cause damage to files stored on the unauthorized recipient's computer. The instructions may also delete the electronic communication from the authorized recipients's electronic message storage if the authorized recipient does not retrieve the communication within a predetermined time period.

Additionally, the present invention provides a way for an authorized recipient to access the contents of the electronic message even if the authorized recipient is unable to decrypt the electronic message.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Secure Email Communication

Figure 1:
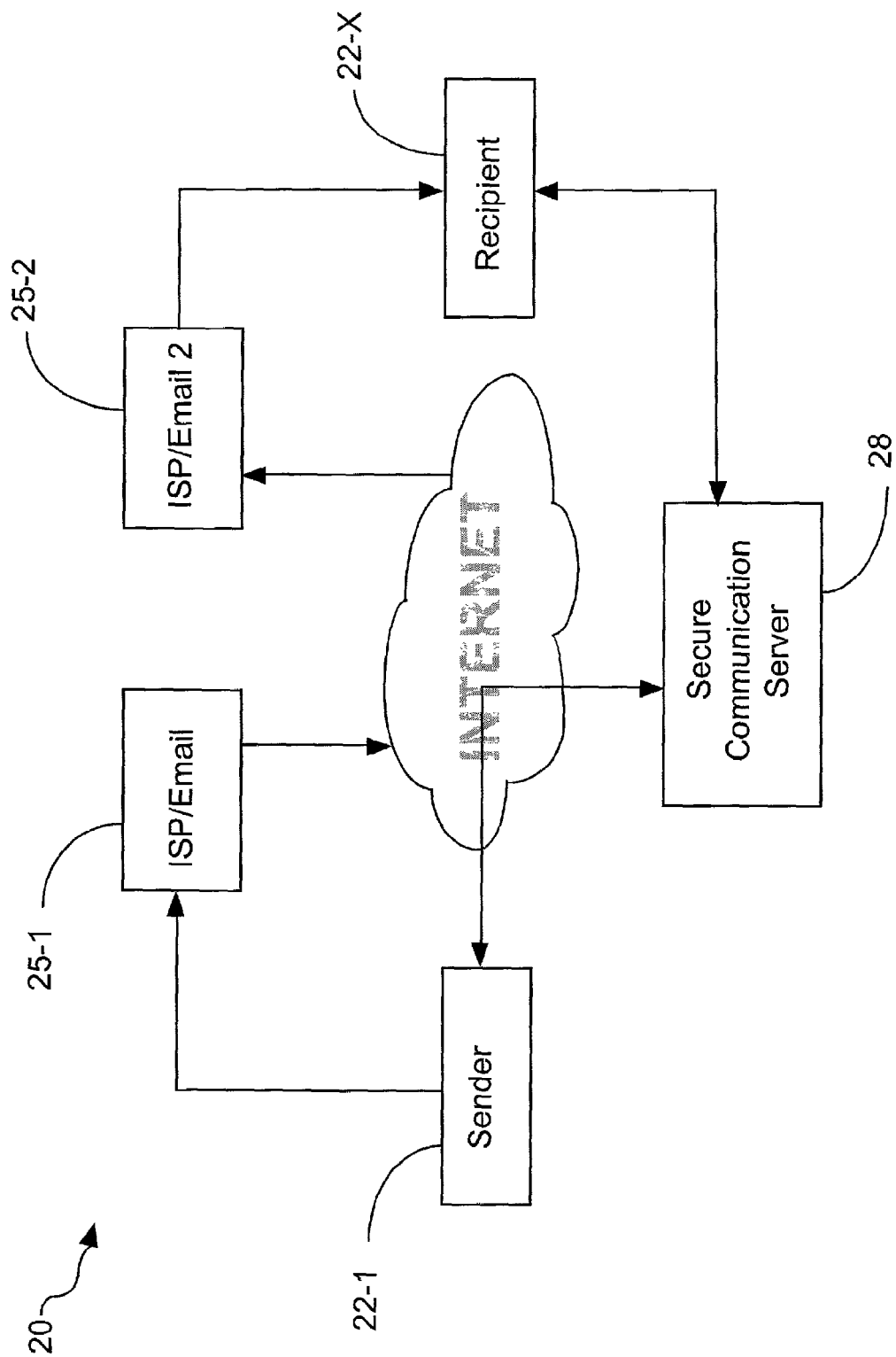
FIG. 1 illustrates a system for providing secure email communication in accordance with one embodiment of the invention.

FIG. 1 illustrates a network 20 that may be operated in accordance with the present invention. The network includes a plurality of client computers 22, at least one ISP/Email Server 25 and a secure communication server 28. In one embodiment, the secure communication server is also an ISP/Email server. Client computers 22 are either sending computers or receiving computers or both.

Figure 2:
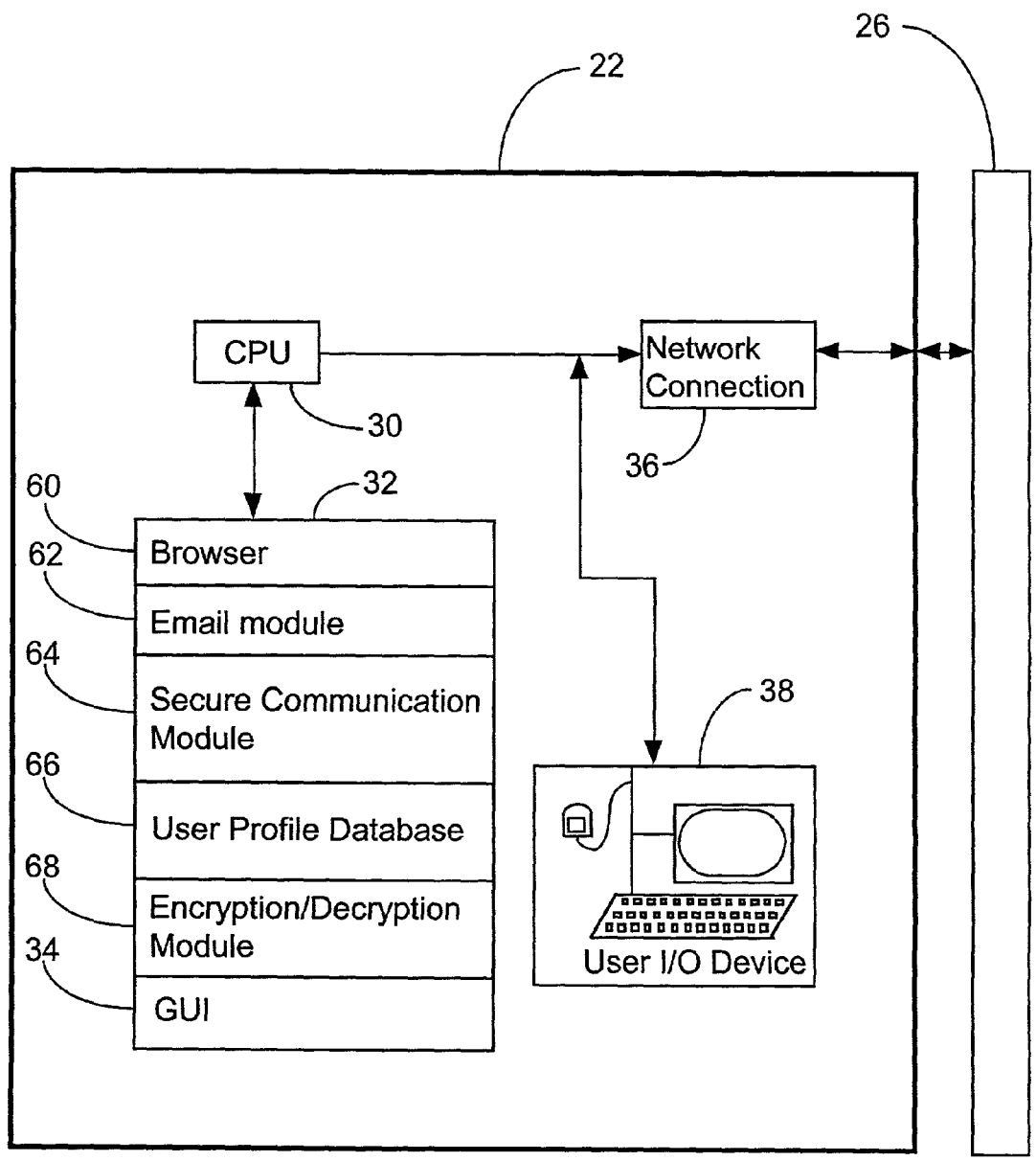
FIG. 2 provides a detailed illustration of the client used in one embodiment of the invention.
Figure 3:
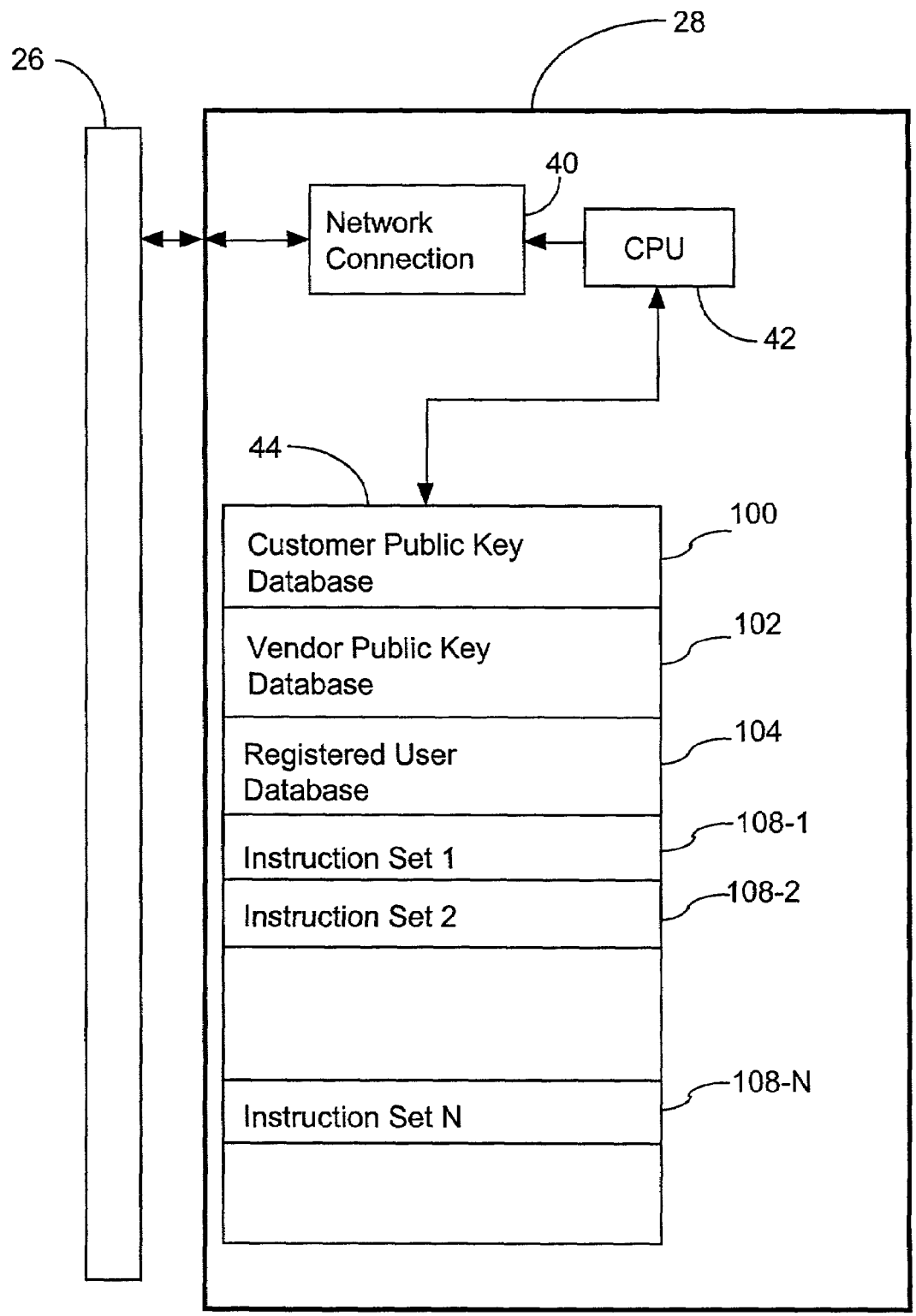
FIG. 3 provides a detailed illustration of the server used in one embodiment of the invention.

FIGS. 2 and 3 provide a more detailed illustration of client computer 22 and server 28. The client computer 22 and the ISP/Email Server 25 depicted in FIG. 1 are connected by a transmission channel 26 which may be any wired or wireless transmission channel. Further, client computer 22 is also connected to secure communication server 28 by transmission channel 26. In one embodiment, client 22 is connected to the ISP/Email server and the secure communication server through the Internet. In other embodiments, client computer 22, ISP/Email server 25, and secure communication server 28 are part of a Local Area Network (LAN) or Wide Area Network (WAN).

Referring back to FIG. 1, ISP/Email server 25 acts as an intermediary that receives and re-transmits electronic messages from client computer 22 to another client computer 22 or to another ISP/Email server 25. ISP/Email server 25 comprises a plurality of mail servers. Each mail server stores e-mail messages for a client computer 22 who has established an account with ISP/Email server 25. Received e-mail messages, addressed to client computers 22 who have accounts with ISP/Email server 25, are stored in the mail servers.

Referring now to FIG. 2, client computer 22 is any device that includes a Central Processing Unit (CPU) 30 connected to a permanent memory (primary and/or secondary) 32, a network connection 36, and a user input/output ("i/o") device 38. Memory 32 typically stores computer programs, which may include a web browser 60, an email module 62, and a secure communication module 64. Additionally, memory 32 also contains a user profile database 66, an encryption/decryption module 68, and graphical user interface (GUI) 34.

In some embodiments, web browser 60 is used to view web pages. Email module 62 is used to send, receive, create and read electronic messages using network connection 36. In one embodiment, email module 62 is any commercially available messaging application such as Eudora. Secure communication module 64 allows a user to receive and transmit secured electronic messages created or received using email module 62.

The encryption/decryption module encrypts a client's electronic communication when the client is sending a secure communication. The encryption/decryption module also decrypts any incoming encrypted communication. GUI 34 is used to access an instruction set list using network connection 36 and to subsequently include an instruction set with the email generated using email module 62.

FIG. 3 provides a more detailed illustration of server 28 that may be used in accordance with the invention. Each secure communication server 28 includes standard server components, including a Central Processing Unit 42, a network connection device 40, and a memory 44. Memory 44 stores a set of computer programs and files used to implement the processing associated with the invention. In particular, memory 44 includes a customer public key directory 100, a vendor public key directory 102, a registered user database 104, and instruction sets 108. In one embodiment, memory 44 also includes a biometric verification module.

The public key directory 100 contains a list of public keys for a user. Only recipients who have a private key associated with the user's public key can decrypt the communication sent by the user. The vendor key directory contains a list of vendor public keys. In one embodiment, the vendor key directory contains a list of vendor keys for vendors who are registered with the secure communications service provider.

Registered user database 104 contains pertinent information about each registered user, including a user ID and a user identifier. In one embodiment, the user identifier is a password containing text and/or numbers. In another embodiment, the user identifier is a biometric identifier, such as a voice sample or a finger print. The user ID uniquely identifies each registered user contained in registered user database 104. User identifiers are provided by the user when the user registers for the secure communication service.

Instruction sets 108 contain instructions a user may include with an electronic communication. In one embodiment, instruction set 108 is executed when a message recipient fails to decrypt an encrypted communication. The sender may specify which instruction set is to be executed when a recipient fails to decrypt an encrypted communication.

For example, in one embodiment, the sender may select from a list of four instruction sets. Instruction set 1 will delete the Email message from the unauthorized recipients' computer. Instruction set 2 provides an additional level of security by providing information about the unauthorized recipient's system to the secure communication server in addition to deleting the Email message from the unauthorized recipient's computer system. In one embodiment, the secure communication server uses this information to monitor for security leaks.

A sender can also select instruction set 3, which will delete the Email message from the unauthorized recipient's computer, send identifying information back to the communication server, and delete other selected files on the unauthorized recipient's computer. And finally the sender can select instruction set 4, which will cause damage to the unauthorized recipient's computer system if the unauthorized recipient attempts to open or decrypt the Email message.

In another embodiment, instruction set 108 includes instructions for deleting the electronic communication after a predetermined time-period. If the recipient does not retrieve the communication within the pre-determined time-period, the communication is deleted. If the recipient retrieves the communication within the time-period, then the instruction set is deleted. This is particularly advantageous when a sensitive communication is stored on a remote server. Placing a time-limit on the transmitted message ensures that the communication is destroyed if the recipient does not retrieve the communication within the allotted time.

This brief description of the present invention is more clearly understood in reference to FIG. 4. FIGS. 4(*a*) and 4(*b*) illustrate the processing steps that may be executed in accordance with one embodiment of the invention. Referring now to FIG. 4(*a*), a sender creates an electronic message using email module 62 (step 402). If the sender does not use secure transmission (step 404-No), the message is transmitted to ISP/Email server 25 and subsequently to the intended recipient (step 414). If the sender invokes secure transmission (404-Yes), sending computer 22 launches secure communication module 64 (step 405).

Sending computer 22 transmits the sender's identifying information to server 28 (step 406). Server 28 then determines whether the user is a valid user (step 416). If the sender is not a valid user (step 416-No), then server 28 transmits a message to sending computer 22 notifying the sender that the sender is not a valid user (step 424). A valid user is a user who is registered with the secured communication service provider associated with server 28.

If the user is a valid user (step 416-Yes), then server 28 transmits a list of instruction sets 108 to sending computer 22 (step 418). The sender selects an instruction set from the list of instruction sets displayed on GUI 34 (step 407). Sending computer 22 then retrieves the selected instruction set 108 from server 28 (step 420). Further, server 28 also transmits the sender's public key stored in Customer Public Key Database 100 (step 422).

Sending computer 22 then inserts instruction set 108 with the email message (step 408). Sending computer 22 next encrypts the email message using the Customer Public Key transmitted by server 28 in step 420 (step 410). Sending computer 22 then inserts a warning (step 412) and transmits the encrypted email message to ISP/Email server 25 (step 414). In one embodiment, the warning informs the recipient of the effect of opening the email or tampering with the email if the recipient is unable to decrypt the email message. In one embodiment, if the sender selects instruction set 1, the warning will inform the recipient that the email message will be deleted if the recipient is unable to decrypt the email message or if the recipient tampers with the email message. Further, the warning contains instructions for retrieving the email message if the recipient is an authorized recipient and is unable to decrypt the message.

Figure 4A:
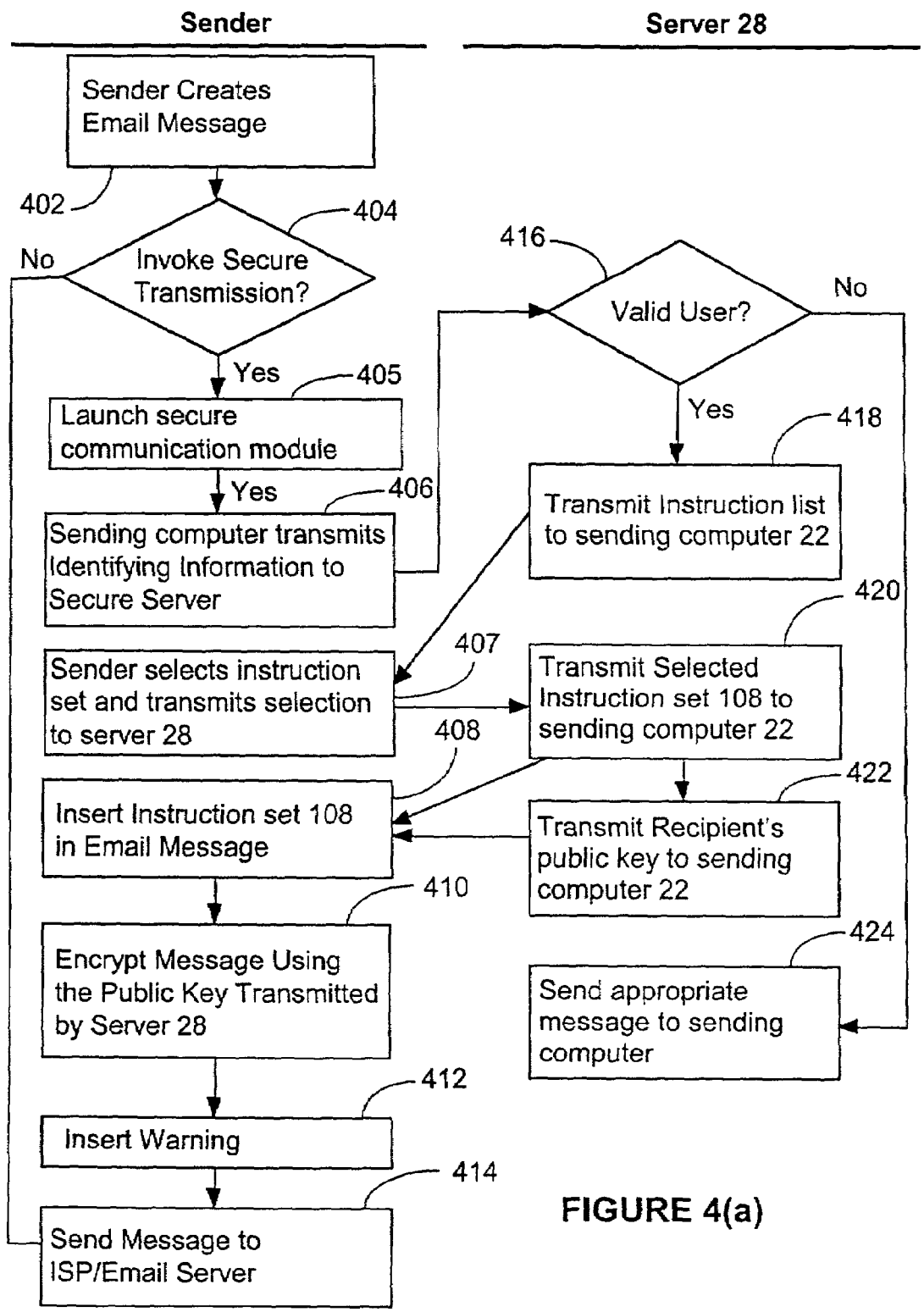
FIG. 4(a) illustrates the processing steps associated with sending a secure email message in accordance with one embodiment of the invention.
Figure 4B:
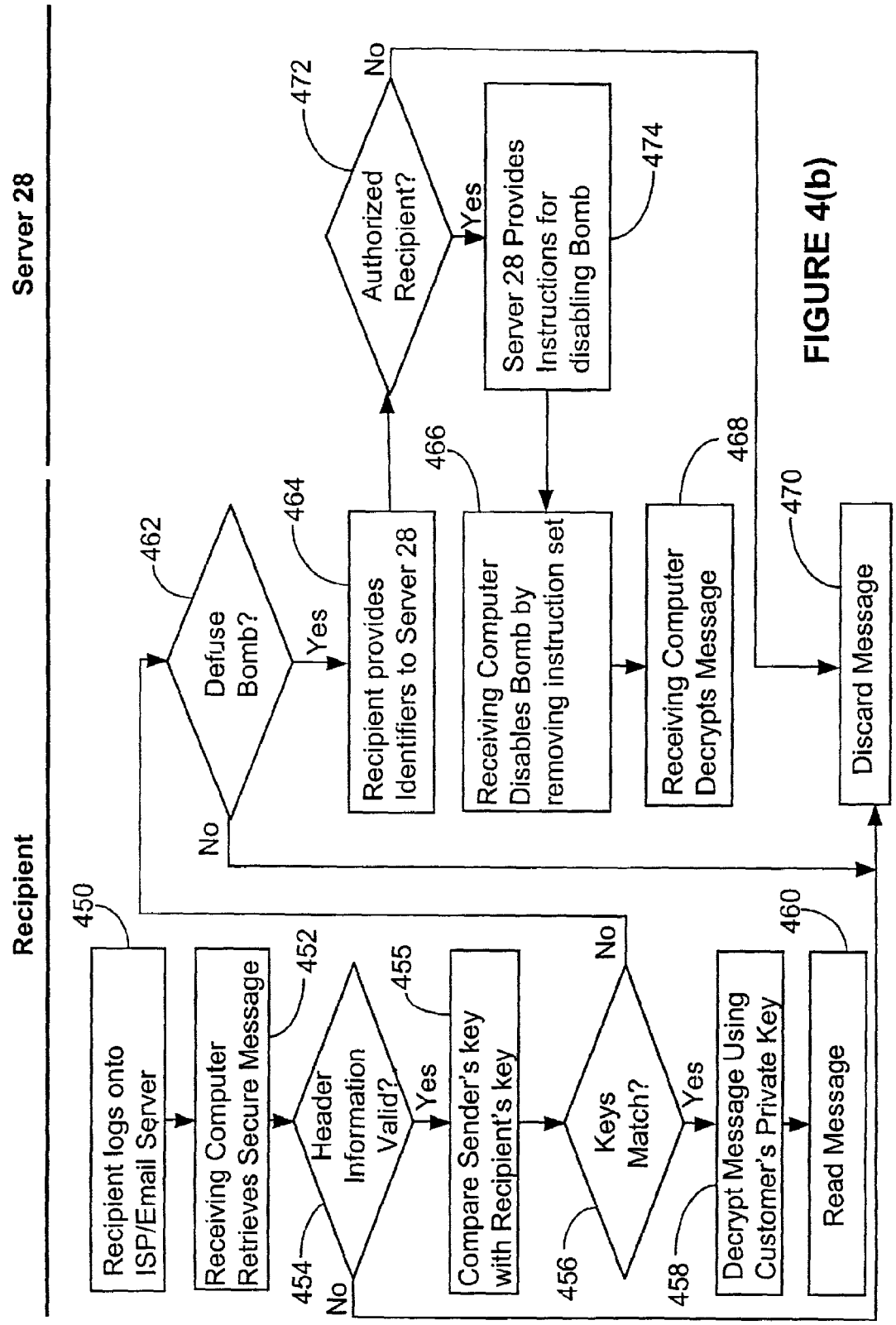
FIG. 4(b) illustrates the processing steps associated with receiving a secure email message in accordance with one embodiment of the invention.

FIG. 4(b) illustrates the steps that are executed when a recipient receives the message created using the method described in FIG. 4(a). The recipient logs onto the ISP/Email server (step 450) and retrieves the secure message (step 452). In one embodiment, the recipient provides biometric identifying information prior to retrieving the secure message. Receiving computer 22 then compares the message header provided in the message and verifies that the message is sent to the correct email address (step 454). The header contains information about the sender and the recipient, i.e. the "From" and "To" lines of an email message.

If the address provided in the "To" line of the header does not match the recipient's information (454-No), receiving computer 22 discards the message (step 470). If the address provided in the "To" line of the header does match the recipient's information (454-Yes), then receiving computer 22 compares the key included in the message with the recipient's private key by, for example, performing a checksum operation (step 455). If the keys match (456-Yes), receiving computer 22 decrypts the message using the recipient's private key (step 458). The decrypted message is then displayed on the receiving computer's screen and the recipient can view the contents of message (step 460).

If the keys do not match (456-No), then the recipient at receiving computer 22 is asked if the recipient wants to "Defuse the Bomb" (step 462). "Defusing" the bomb allows an authorized user to view the contents of the email message when the authorized user is unable to decrypt the email message. If the recipient chooses not to "Defuse the Bomb" (462-No), then receiving computer 22 discards the email message (step 470). In one embodiment, receiving computer 22 automatically deletes the email message when the keys do not match. In another embodiment, receiving computer 22 executes the instruction set included with the message when the keys do not match or when the recipient does not have a key. If the recipient chooses to "Defuse the Bomb" (step 462-Yes), then the recipient transmits additional identifiers, such as a password or biometric identifiers, to server 28 (step 464).

Server 28 then determines whether the recipient is the intended recipient by comparing the information provided by the recipient against information stored on the server (step 472). If the identifiers do not match (step 472-No), then server 28 sends an appropriate message and instructions to receiving computer 22 and receiving computer 22 subsequently deletes the message (step 470).

If the identifiers do match (472-Yes), then server 28 transmits instructions that delete the instruction set included in the message (step 474). Receiving computer 22 then removes the instruction set from the message (step 466). The recipient then takes the steps necessary to decrypt the message (step 468). The recipient may attempt to decrypt the message using the private key used in step 456 or, if the key is corrupted, the recipient may reinstall the private key before attempting to decrypt the message. In another embodiment, the recipient transmits the encrypted message to server 28. Server 28 decrypts the message and transmits the decrypted message back to the recipient.

At this point, a number of unique attributes to the invention will be recognizable to those skilled in the art. The invention protects the message during transit. Additionally, the invention allows the sender to ensure that the message is read only by the intended recipient. If an unintended recipient attempts to read the message, the bomb is triggered and the message is destroyed, thus ensuring that sensitive information is protected.

Secure eCommerce Transactions

Figure 5:
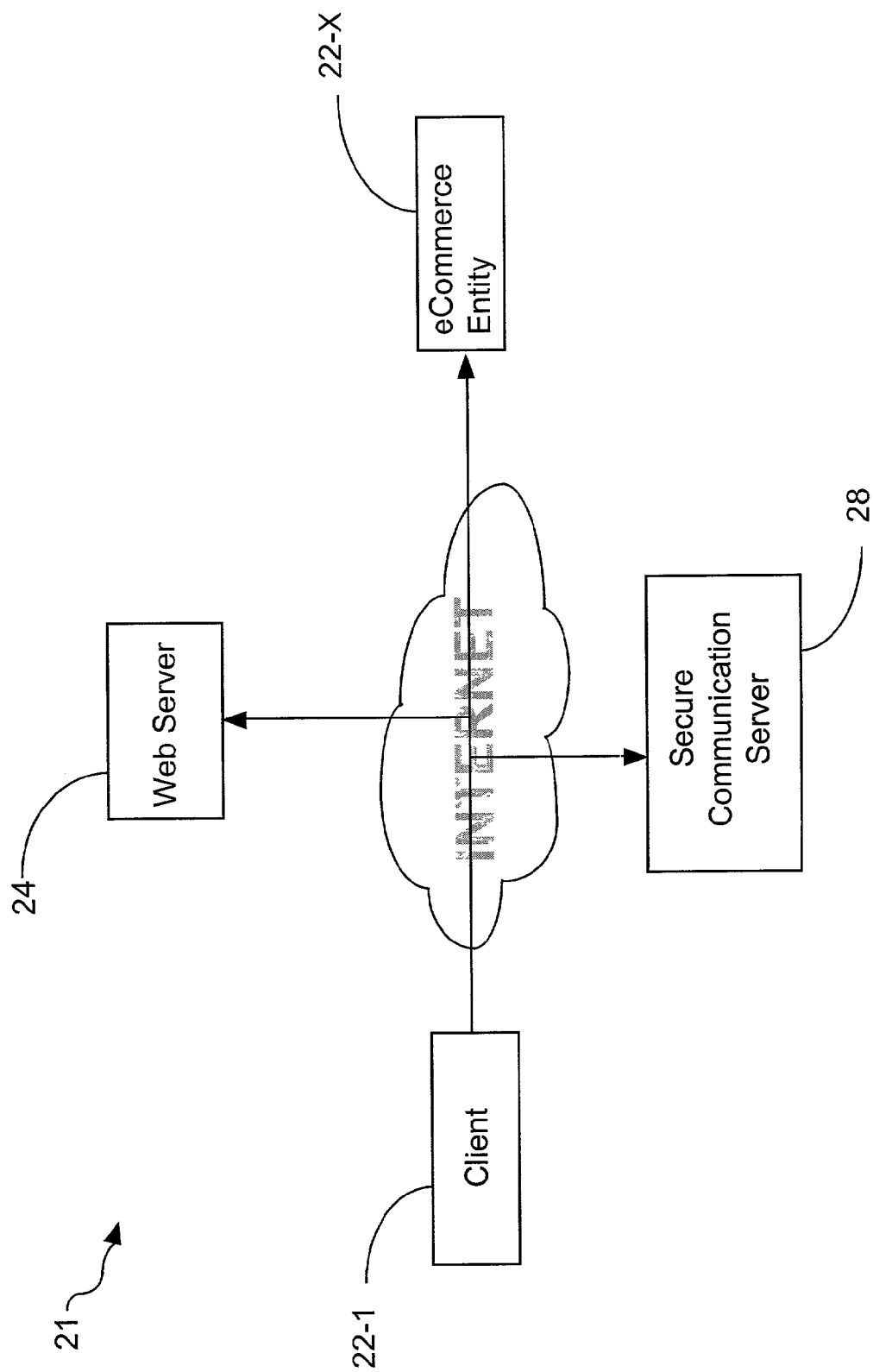
FIG. 5 illustrates a system for providing secure email communication in accordance with one embodiment of the invention.

FIG. 5 illustrates a network 21 that may be operated in accordance with the present invention when conducting commercial transactions on the World Wide Web ("Web"). The network 21 includes a plurality of client computers 22, at least one Web Server 24, a Secure Communication Server 28 and vendor computer 22-X. The client computer 22 is connected to vendor computer 22-X and Web Server 24 by a transmission channel 26 (FIG. 2). Further, client computer 22 is also connected to a secure communication server 28 by transmission channel 26. A detailed description of client 22 and server 28 was provided in the previous section. Web Server 24 is a typical Web server that hosts an eCommerce entity's web site.

Figure 6A:
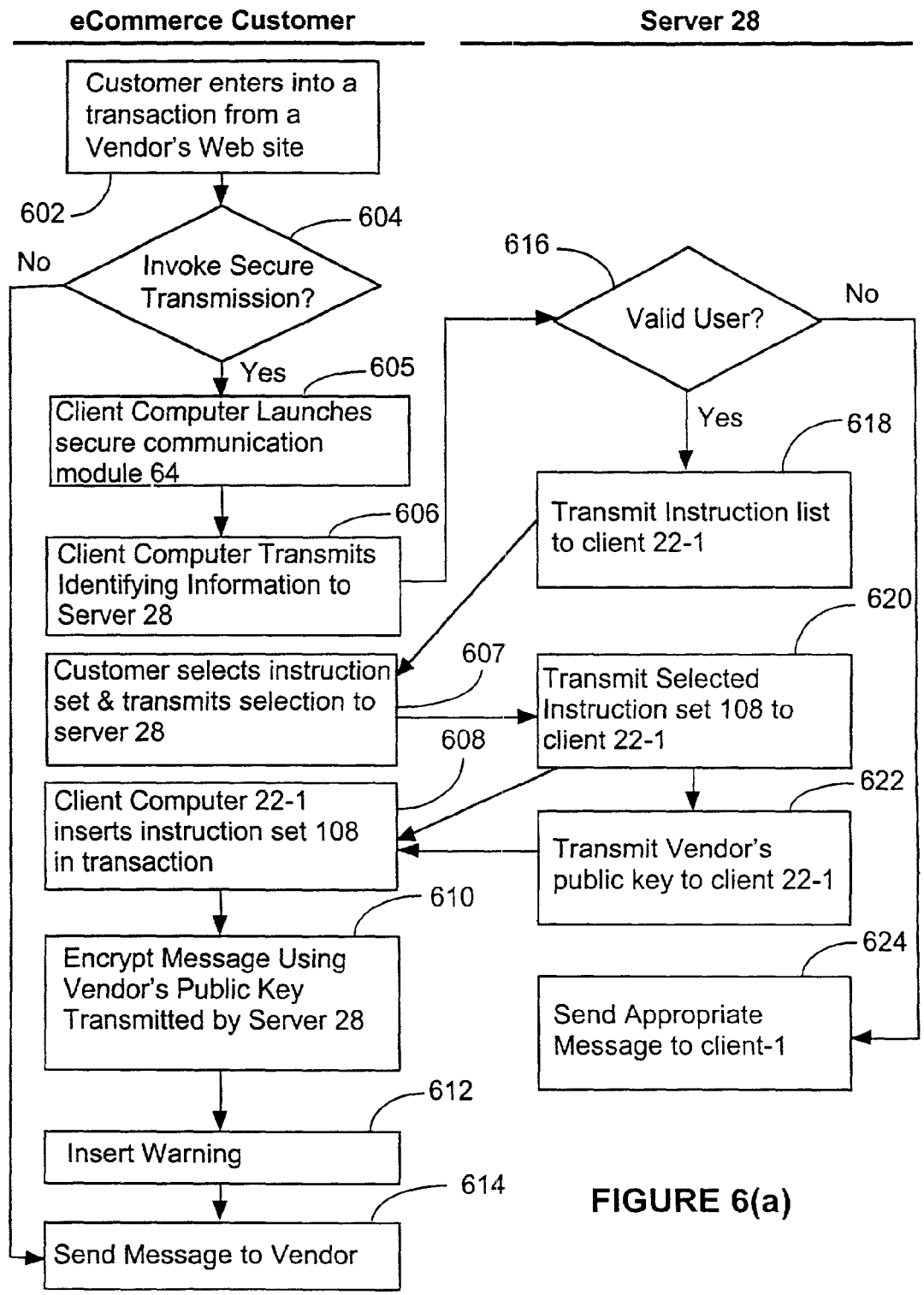
FIG. 6(a) illustrates the processing steps associated with transmitting secure communication from a Vendor's web site.
Figure 6B:
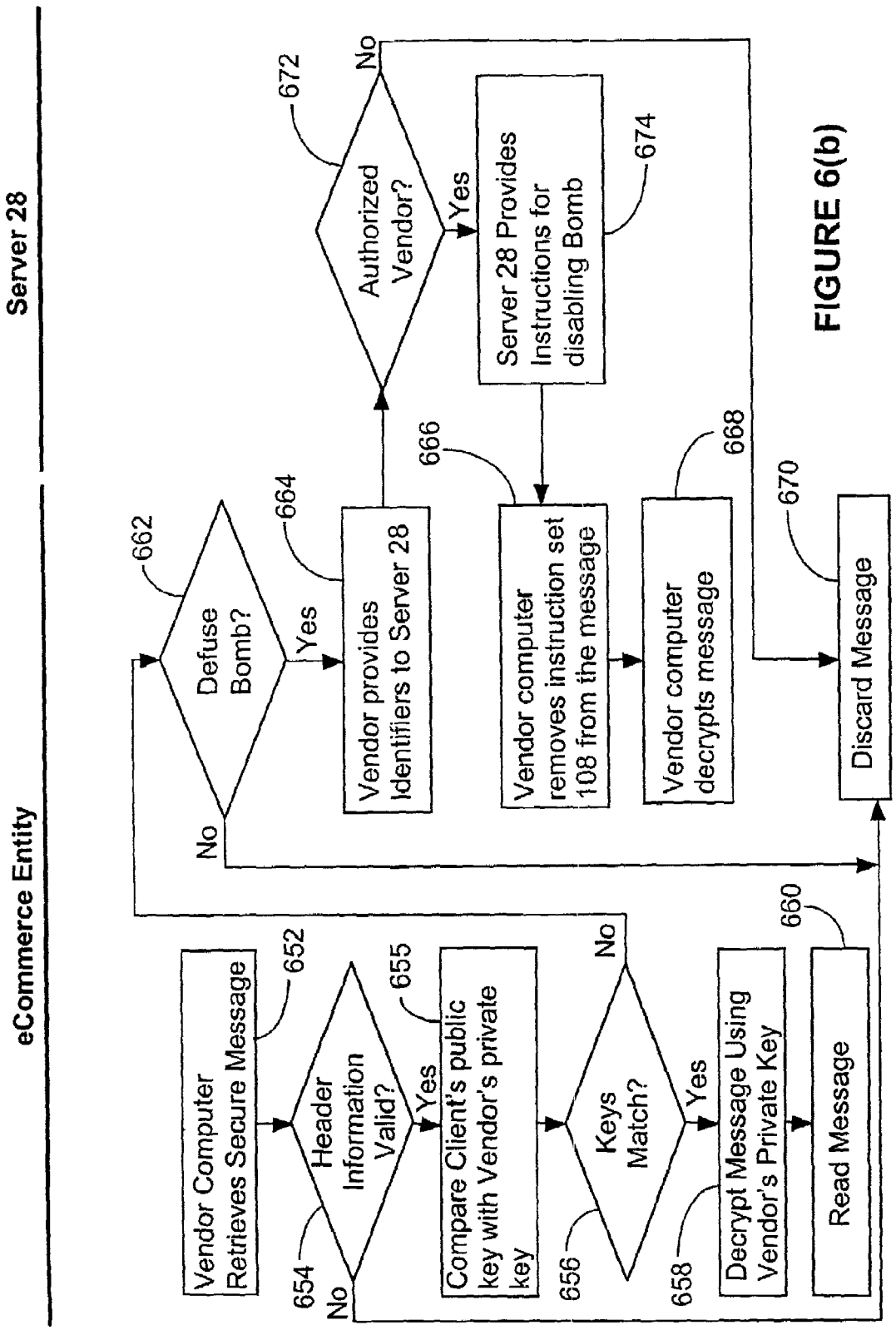
FIG. 6(b) illustrates the processing steps associated with receiving a secure communication from a customer.

FIGS. 6(a) and 6(b) illustrate the processing steps that may be executed when conducting a commercial transaction on the Web. Referring now to FIG. 6(a), a client enters into a commercial transaction from a Vendor's web site (step 602). The client may invoke secure transmission any time during the transaction by launching the secure communication module 64. If the client chooses not to use secure transmission (step 604-No), the message is transmitted to the vendor using the security measures provided by the vendor (step 614). If the client chooses to use secure transmission (604-Yes), client computer 22-1 launches secure communication module 64 (step 605). Client computer 22-1 transmits the client's identifying information including the client's identifiers to server 28 (step 606). Server 28 then determines whether the client is a valid user (step 616). If the client is not a valid user (step 616-No), then server 28 sends a message to client computer 22-1 notifying the client that the client is not a valid user (step 624). A valid user is a user who is registered with the secured communication service provider associated with server 28.

If the user is a valid user (step 616-Yes), then server 28 transmits a list of instruction sets 108 to client computer 22-1 (step 618). The client selects an instruction set from the list of instruction sets displayed on GUI 34 (step 607). Client computer 22-1 then retrieves the selected instruction set 108 from server 28 (step 620). Further, server 28 also transmits the Vendor's public key stored in Vendor Public Key Database 100 (step 622). In one embodiment, client computer 22 retrieves the Vendor's public key from vendor computer 22-X.

Client computer 22-1 inserts instruction set 108 with the transaction communication (step 608). Client computer 22-1 next encrypts the communication using the public key transmitted by server 28 in step 622 (step 610). Client computer 22-1 then inserts a warning (step 612) and transmits the encrypted communication to vendor computer 22-X (step 614).

FIG. 6(b) illustrates the steps that are executed when a Vendor receives the communication created using the method described in FIG. 6(a). The Vendor retrieves the secure communication transmitted in step 614 (step 652). Vendor computer 22-X then compares the message header provided in the communication and verifies that the communication is intended for the Vendor (step 654). The header contains information about the client and the Vendor, i.e. the "From" and "To" lines of the communication.

If the address provided in the "To" line of the header does not match the Vendor's information (654-No), vendor computer 22-X discards the message (step 670). If the address provided in the "To" line of the header does match the Vendor's information (654-Yes), then vendor computer 22-X compares the key included in the communication with the Vendor's private key (step 655). If the keys match (656-Yes), vendor computer 22-X decrypts the communication using the Vendor's private key (step 658). The decrypted message is then displayed and the Vendor can view the contents of message (step 660).

If the keys do not match (656-No), then the Vendor is asked if the Vendor wants to "Defuse the Bomb" (step 662). "Defusing" the bomb allows the Vendor to view the contents of the communication when the Vendor is unable to decrypt the communication. If the Vendor chooses not to "Defuse the Bomb" (662-No), then vendor computer 22-X discards the communication (step 670). In one embodiment, vendor computer 22-X automatically deletes the email message when the keys do not match. In another embodiment, vendor computer 22-X executes the instruction set included with the message when the keys do not match or when the vendor does not have a key. If the Vendor chooses to "Defuse the Bomb" (step 662-Yes), then the Vendor transmits additional identifiers to server 28 (step 664).

Server 28 then determines whether the Vendor is the intended recipient of the communication by comparing the information provided by the Vendor against information stored on server 28 (step 672). If the identifiers don't match (step 672-No), then server 28 sends an appropriate message and instructions to vendor computer 22-X and vendor computer 22-X subsequently deletes the communication (step 670).

If the identifiers do match (672-Yes), then server 28 transmits instructions that remove instruction set 108 included in the communication (step 674). Vendor computer 22-X then removes the instruction set from the communication (step 666). The Vendor takes the steps necessary to decrypt the message (step 668). The Vendor may attempt to decrypt the message using the private key used in step 656 or, if the key is corrupted, the Vendor may reinstall the private key before attempting to decrypt the message. In another embodiment, the Vendor transmits the encrypted message to server 28. Server 28 decrypts the message and transmits the decrypted message back to the Vendor.

The foregoing descriptions of specific embodiments of the present invention are presented for the purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications and to enable those skilled in the art to best utilize the invention.

What is claimed is:

1. A method of providing secure communication in a network, said method comprising:
   providing an instruction set in response to a request by a sending computer for secure communication wherein said instruction set is executed by a receiving computer when a predetermined condition is met; and
   disabling said instruction set upon verification of identifying user information received from said receiving computer.

2. The method of claim 1 wherein said providing step includes the step of selecting one or more instruction sets from a group of instruction sets comprising instructions for destroying a communication and its accompanying instruction set, instructions for removing selected information from said receiving computer, and instructions for transmitting information from said receiving computer.

3. The method of claim 1 wherein said predetermined condition is the failure of the receiving computer to decrypt an encrypted communication received from said sending computer.

4. The method of claim 1 wherein said disabling step includes the step of comparing said identifying user information against a list of identifying user information wherein said identifying user information uniquely identifies a user.

5. The method of claim 1 wherein said identifying user information is a biometric identifier.

6. The method of claim 1 further comprising:
   receiving an encrypted communication and instruction set from a receiving computer;
   verifying identifying information provided by said receiving computer;
   decrypting said encrypted communication upon successful verification of said identifying information; and
   transmitting said decrypted communication to said receiving computer.

7. A computer system for providing secure communication in a networked environment, the computer system comprising:
   a central processing unit;
   a memory, coupled to said central processing unit, said memory storing:
      a list of instruction sets wherein instructions in said instruction set are performed by a receiving computer;
      a database containing identifying user information wherein said identifying user information uniquely identifies a user; and
      a secure communication module comprising:
         instructions for providing an instruction set in response to a request for secure communication by a sending computer wherein said instruction set is executed by said receiving computer when a predetermined condition is met; and
         instructions for disabling said instruction set upon verification of said identifying user information received from said receiving computer.

8. The computer system of claim 7 wherein said providing instructions include instructions for selecting one or more instruction sets from a group of instruction sets comprising instructions for destroying a communication and its accompanying instruction set, instructions for removing selected information from said receiving computer, and instructions for transmitting information from said receiving computer.

9. The computer system of claim 7 wherein said predetermined condition is the failure of said receiving computer to decrypt an encrypted communication received from said sending computer.

10. The computer system of claim 7 wherein said instructions for disabling said instruction set include instructions for comparing said identifying user information against said database of identifying user information.

11. The computer system of claim 7 wherein said identifying user information is a biometric identifier.

12. The computer system of claim 7 wherein said secure communication module further includes:
- instructions for receiving an encrypted communication and instruction set from a receiving computer;
- instructions for verifying identifying user information provided by said receiving computer;
- instructions for decrypting said encrypted communication upon successful verification of said identifying user information; and
- instructions for transmitting said decrypted communication to said receiving computer.

13. A computer software program for use in conjunction with a computer system, the computer program comprising a computer-readable storage medium and a computer program mechanism embedded therein, the computer program mechanism comprising:
- a list of instruction sets wherein instructions in said instruction set are performed by a receiving computer;
- a database containing identifying user information wherein said identifying user information uniquely identifies a user; and
- a secure communication module comprising:
  - instructions for providing an instruction set in response to a request for secure communication by a sending computer wherein said instruction set is executed by a receiving computer when a predetermined condition is met; and
  - instructions for disabling said instruction set upon verification of said identifying user information received from said receiving computer.

14. The computer software program of claim 13 wherein said providing instructions include instructions for selecting one or more instruction sets from a group of instruction sets comprising instructions for destroying a communication and its accompanying instruction set, instructions for removing selected information from said receiving computer, and instructions for transmitting information from said receiving computer.

15. The computer software program of claim 13 wherein said predetermined condition is the failure of said receiving computer to decrypt an encrypted communication received from said sending computer.

16. The computer software program of claim 13 wherein said instructions for disabling said instruction set include instructions for comparing said identifying user information against said database of identifying user information.

17. The computer software program of claim 13 wherein said identifying user information is a biometric identifier.

18. The computer software program of claim 13 wherein said secure communication module further includes:
- instructions for receiving an encrypted communication and instruction set from a receiving computer;
- instructions for verifying identifying information provided by said receiving computer;
- instructions for decrypting said encrypted communication upon successful verification of said identifying information; and
- instructions for transmitting said decrypted communication to said receiving computer.

* * * * *